US011230805B2

(12) United States Patent
Kessler et al.

(10) Patent No.: US 11,230,805 B2
(45) Date of Patent: Jan. 25, 2022

(54) METHOD FOR DETERMINING A POSITION OF AN APPARATUS WHICH CAN BE INSERTED INTO A DOMESTIC DEVICE

(71) Applicant: Henkel AG & Co. KGaA, Duesseldorf (DE)

(72) Inventors: Arnd Kessler, Monheim am Rhein (DE); Lars Zuechner, Langenfeld (DE); Robert Ruiz Hernandez, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 16/767,501

(22) PCT Filed: Jan. 8, 2019

(86) PCT No.: PCT/EP2019/050319
§ 371 (c)(1),
(2) Date: May 27, 2020

(87) PCT Pub. No.: WO2019/137900
PCT Pub. Date: Jul. 18, 2019

(65) Prior Publication Data
US 2020/0359174 A1     Nov. 12, 2020

(30) Foreign Application Priority Data
Jan. 9, 2018   (DE) .................... 10 2018 200 214.2

(51) Int. Cl.
*D06F 39/02*      (2006.01)
*D06F 34/20*      (2020.01)
(Continued)

(52) U.S. Cl.
CPC ............ *D06F 39/024* (2013.01); *D06F 33/30* (2020.02); *D06F 34/20* (2020.02);
(Continued)

(58) Field of Classification Search
CPC . H04W 4/002–023; H04W 4/29; H04W 4/38; H04W 64/00–006;
(Continued)

(56) References Cited

U.S. PATENT DOCUMENTS 10,492,033 B1 *  11/2019  Kim .................... H04W 4/029
2012/0222712 A1   9/2012  Bastigkeit et al.
(Continued)

FOREIGN PATENT DOCUMENTS

DE          10114256 A1     10/2002
DE       202007018460 U1     9/2008
(Continued)

OTHER PUBLICATIONS

EPO, International Search Report issued in International Application No. PCT/EP2019/050319, dated Mar. 27, 2019.

*Primary Examiner* — Brendan Y Higa
(74) *Attorney, Agent, or Firm* — Lorenz & Kopf, LLP

(57) ABSTRACT

The present disclosure concerns a method performed by at least one device, including: acquiring location data indicative of a location of a device which may be placed in a liquid- and/or gas-carrying household appliance; determining treatment chamber data indicative of a conclusion as to whether or not the at least one device is placed in a treatment chamber of the household appliance, the treatment chamber data being determined at least partially based on the acquired location data; and outputting or causing the output of the determined treatment chamber data. Furthermore, the present disclosure concerns a device and a system.

16 Claims, 4 Drawing Sheets

(51) Int. Cl.

| | | |
|---|---|---|
| *D06F 33/30* | (2020.01) | |
| *D06F 103/60* | (2020.01) | |
| *D06F 105/38* | (2020.01) | |
| *D06F 105/42* | (2020.01) | |
| *D06F 33/50* | (2020.01) | |
| *D06F 34/05* | (2020.01) | |
| *D06F 25/00* | (2006.01) | |
| *H04W 4/38* | (2018.01) | |
| *H04W 4/029* | (2018.01) | |
| *H04L 12/28* | (2006.01) | |
| *H04L 29/08* | (2006.01) | |
| *D06F 58/20* | (2006.01) | |

(52) U.S. Cl.
CPC .......... *H04L 12/2823* (2013.01); *H04L 67/12* (2013.01); *H04W 4/029* (2018.02); *H04W 4/38* (2018.02); *A47L 2401/32* (2013.01); *A47L 2401/34* (2013.01); *A47L 2501/26* (2013.01); *D06F 25/00* (2013.01); *D06F 33/50* (2020.02); *D06F 34/05* (2020.02); *D06F 58/203* (2013.01); *D06F 2103/60* (2020.02); *D06F 2105/38* (2020.02); *D06F 2105/42* (2020.02); *H04L 2012/285* (2013.01); *H04L 2012/2841* (2013.01)

(58) Field of Classification Search
CPC . H04L 12/2803–2838; H04L 29/08657; H04L 67/12; H04L 67/18; H04L 2012/284–285; D06F 34/00–34; D06F 2101/00–20; D06F 2105/00–62

See application file for complete search history.

(56) References Cited

U.S. PATENT DOCUMENTS

| | | | | |
|---|---|---|---|---|
| 2015/0275414 | A1* | 10/2015 | Tanaka | D06F 34/18 455/557 |
| 2015/0326704 | A1* | 11/2015 | Ko | H04M 1/72457 455/456.3 |
| 2016/0049052 | A1* | 2/2016 | Cheatham, III | G08B 7/00 348/14.16 |
| 2017/0081796 | A1* | 3/2017 | Belveal | D06F 34/05 |

FOREIGN PATENT DOCUMENTS

| | | |
|---|---|---|
| DE | 102010031621 A1 | 1/2012 |
| DE | 102016203095 A1 | 8/2017 |
| WO | 2017042087 A1 | 3/2017 |
| WO | 2017167658 A1 | 10/2017 |

* cited by examiner

METHOD FOR DETERMINING A POSITION OF AN APPARATUS WHICH CAN BE INSERTED INTO A DOMESTIC DEVICE

CROSS-REFERENCE TO RELATED APPLICATION

This application is a U.S. National-Stage entry under 35 U.S.C. § 371 based on International Application No. PCT/EP2019/050319, filed Jan. 8, 2019, which was published under PCT Article 21(2) and which claims priority to German Application No. 10 2018 200 214.2, filed Jan. 9, 2018, which are all hereby incorporated in their entirety by reference.

TECHNICAL FIELD

The present disclosure concerns methods and devices for determining a location of a device which may be placed in a liquid- and/or gas-containing household appliance.

BACKGROUND

Devices and methods for controlling and/or regulating household appliances such as washing machines, dishwashers or tumble dryers are known from the state of the art. The aim in operating such household appliances is typically to achieve a high degree of user-friendliness and at the same time the best possible result (in the case of a washing machine, in particular, the most immaculate cleaning result possible).

If, for example, increased soiling is to be taken into account, a user must take this into account manually, for example, and select an appropriate program or detergent. Approaches are known in which parameters of the household appliance are automatically adjusted in order to achieve the best possible result. For example, parameters of the household appliance are configured to parameters defined by the detergent used. For example, the washing program of a washing machine is configured to the detergent used.

Furthermore, dosing devices that may be placed in a treatment chamber of household appliances are known to automatically dose, for example, detergent into the treatment chamber.

The disadvantage is that in many situations and scenarios the result to be achieved is still in need of improvement, e.g. the detergent is dosed by a dosing device placed in a treatment chamber depending on a control command. It may occur, for example, that the cleaning agent is dosed too early or too late, or even that the dosing device is not located in the treatment chamber of a household appliance.

SUMMARY

Against the background of the described state of the art, it is therefore the task to reduce or avoid the described problems at least partially, i.e. in particular to variably improve the result to be achieved with a household appliance with regard to the many possible situations and scenarios and to ensure the highest possible reliability. It is also the task of variably improving other areas of application involving the treatment of liquid and/or gas, in particular bad odors, with regard to the above-mentioned and achievable result.

This task is solved by a method with the characteristics of claim 1.

According to a first aspect of the present disclosure, a method is described, carried out by one or more devices, including the method:
acquiring location data indicative of a location of a device which may be placed in a liquid- and/or gas-containing household appliance;
determining treatment chamber data indicative of a conclusion as to whether or not the at least one device is placed in a treatment chamber of the household appliance, wherein the treatment chamber data is determined at least partially based on the acquired location data; and
outputting or causing the output of the specific treatment chamber data.

According to a second aspect of the present disclosure, a device is described which is configured or includes corresponding means to perform and/or control a method according to the first aspect. Devices of the method according to the first aspect are or include in particular one or more devices according to the second aspect.

The device according to the second aspect of the present disclosure is, for example, a dosing device and/or a physical treatment device. A dosing device is designed and/or configured in particular for dispensing a preparation including treatment agents, perfumes, washing and/or cleaning agents. The device according to the second aspect of the present disclosure is for example a sensor device for detecting location data regarding the location of the device (e.g. inside or outside a treatment chamber of the household appliance) to the household appliance. The device according to the second aspect of the present disclosure is for example also a device for physical treatment—also physical treatment device of a liquid (e.g. water) or a gas (e.g. a unit which emits electromagnetic radiation, e.g. UV light, which applies an electrical voltage to a liquid or a gas, e.g. for effecting chemical reactions, or for ionizing a gas, e.g. for producing a certain chemical compound such as ozone or oxygen, and/or for treating a bad smell and/or for enriching a liquid, in particular water, with a treatment agent, fragrances, washing and/or cleaning agents, or a combination thereof).

The device according to the second aspect is, for example, a dosing device and/or a physical treatment device in combination with such a sensor device.

Alternatively or in addition, the employing the device or the device itself according to the second aspect may further include one or more further sensors and/or one or more communication interfaces.

A communication interface should be understood to mean, for example, a wireless communication interface and/or a wired communication interface.

A wireless communication interface is for example a communication interface according to a wireless communication technology. An example for a wireless communication technology is a local radio network technology such as Radio Frequency Identification (RFID) and/or Near Field Communication (NFC) and/or Bluetooth (e.g. Bluetooth Version 2.1 and/or 4.0) and/or Wireless Local Area Network (WLAN). RFID and NFC, for example, are specified according to ISO standards 18000, 11784/11785 and ISO/IEC standards 14443-A and 15693. WLAN, for example, is specified in the standards of the IEEE 802.11 family Another example of a wireless communication technology is a supra-local radio network technology such as a mobile radio technology, for example Global System for Mobile Communications (GSM) and/or Universal Mobile Telecommunications System (UMTS) and/or Long Term Evolution (LTE). GSM, UMTS and LTE specifications are maintained and developed by 3rd Generation Partnership Project (3GPP).

A wired communication interface is, for example, a communication interface according to a wired communication technology. Examples of a wired communication technology are a Local Area Network (LAN) and/or a bus system, for example a Controller Area Network bus (CAN bus) and/or a Universal Serial Bus (USB). CAN bus, for example, is specified according to ISO standard ISO 11898. LAN, for example, is specified in the standards of the IEEE 802.3 family. It is understood that the device according to the second aspect may also include other means not listed.

In the following, exemplary features and exemplary embodiments are described in more detail according to all aspects:

A liquid- and/or gas-containing household appliance is understood to be, in particular, a household appliance or a sanitary installation with a treatment chamber.

A household appliance is understood in particular to be a washing machine and/or a dishwasher, in particular also a (laundry) dryer, and/or a washer-dryer. Corresponding household appliances may have a treatment chamber which is equipped to receive objects such as household goods, textiles, dishes and/or cutlery and to subject them to a treatment inside the treatment chamber, e.g. cleaning and/or drying, e.g. as part of a cleaning program which may be carried out by the household appliance. In particular, a household appliance is understood to be a water-containing household appliance in which, for example, water is at least partially used to treat the objects, such as dishes or laundry, in particular within the framework of a feasible cleaning program.

Sanitary equipment including a treatment chamber is understood to mean in particular a toilet. It is known that corresponding toilets have a toilet bowl which is regularly made of porcelain and is referred to as a treatment chamber. The toilet bowl is flushed with a liquid, especially water. In addition, bad odors, which may be caused by gas, may occasionally occur in this treatment chamber. The term treatment chamber in the present case therefore refers to the treatment of liquids in particular, such as water flushing the toilet bowl and gases which may be produced.

The device is designed to be placed in a corresponding treatment chamber of such a household appliance and has, in particular, an appropriate size which allows the device to be at least partially removed from the treatment chamber after an initial installation (re-installation). In particular, the device may be placed loosely and/or without connecting means in the treatment chamber. For example, in the case of a washing machine, dishwasher, dryer or washer-dryer, the device is to be placed and/or removed together with the objects to be cleaned in the treatment chamber. In particular, a casing of the device shall partially or completely enclose some or all of the employing the device. In particular, the casing is designed to be liquid-tight or watertight so that some or all of the employing the device do not come into contact with liquid, in particular water, when the device is placed in a treatment chamber, for example, the treatment chamber of a washing machine or toilet, and in particular during a treatment.

The device according to the second aspect is in particular a mobile and/or portable device and/or a device different from the household device. By a mobile and/or portable device is meant, for example, a device whose external dimensions are, for example, smaller than about 30 cm×30 cm×30 cm, such as smaller than about 15 cm×15 cm×15 cm.

A device other than a household appliance is, for example, a device which has no functional connection with the household appliance and/or is not a part permanently connected to the household appliance. For example, a mobile and/or portable device as well as a device other than a household appliance shall be understood to mean a device placed (e.g. inserted) by a user in the washing and/or cleaning area of the household appliance (e.g. the drum of a washing machine) for the duration of a treatment process (e.g. cleaning program).

In a configuration according to all aspects of the present disclosure, the temperature range provided for the treatment chamber of the household appliance during a treatment is from 0° C. to about 150° C., in particular from about 20° C. to about 75° C. or from about 30° C. to about 60° C.

The device further includes, for example, a storage container. Such a storage container is configured, for example, to contain a preparation (e.g. a certain amount of a detergent and/or cleaning agent). For example, the storage container has one or more storage compartments to hold the preparation. If the storage container has several storage compartments, each of the storage compartments may, for example, contain a different preparation such as a different detergent and/or cleaning product and/or a different mixture of detergents and/or cleaning agents and/or fragrance and/or treatment agents. For example, the storage container may have a specific spatial shape (e.g. cube-shaped, spherical and/or plate-like). For example, the storage container may be at least partially dimensionally stable. Alternatively or additionally, the storage container may, for example, be at least partially flexible, for example as a flexible packaging material (e.g. as a tube and/or a bag). It is understood that the storage container may also be designed as an at least partially flexible container surrounded by an at least partially dimensionally stable receptacle, for example as a bag in a substantially dimensionally stable frame.

The preparation, in particular a washing and/or cleaning agent, a fragrance, a treatment agent or a combination thereof, is contained in or stocked by the storage container, for example in solid, liquid and/or gaseous form. For example, the preparation is a pure substance and/or a mixture of substances. A solid preparation, such as a detergent and/or cleaning agent, may be contained in the storage container, for example in powder, tablet and/or tab form. A liquid preparation may, for example, be contained or stored in the storage container as a gel, concentrated and/or diluted solution. It is understood that the preparation may also be contained in the storage container as foam, rigid foam, emulsion, suspension and/or aerosol. Non-concluding examples of preparations or detergents and/or cleaning agents and/or their ingredients are one or more components from a group of components including surfactants, alkalis, builders, graying inhibitors, optical brighteners, enzymes, bleaching agents, soil release polymers, fillers, plasticizers, fragrances, dyes, care substances, acids, starch, isomalt, sugar, cellulose, cellulose derivatives, carboxymethyl cellulose, polyetherimide, silicone derivatives and/or polymethylimines Other non-exhaustive examples of exemplary ingredients are bleach activators, complexing agents, builders, electrolytes, non-aqueous solvents, pH-adjusting agents, perfume carriers, fluorescent agents, hydrotropes, silicone oils, bentonites, anti-redeposition agents, anti-shrinking agents, anti-crease agents, color transfer inhibitors, antimicrobial agents, germicides, fungicides, antioxidants, preservatives, corrosion inhibitors, anti-static agents, bittering agents, ironing aids, phobic or impregnating agents, swelling or slipping agents and/or UV absorbers.

The device is designed and/or configured to dose the preparation, for example, based on a control signal generated by the device on the basis of one or more different data (e.g. treatment chamber data) or transmitted to the device by another entity different from the device.

The location data is, for example, indicative of a location of the device. For example, the location data represents a location of the device in relation to the household appliance, for example, whether the device is inside or outside a treatment chamber of the household appliance. For example, the location data represents a geographical location of the device, for example, in relation to a room in a household that houses the household appliance. Furthermore, the location data may, for example, represent a location in the form of coordinates (e.g. x-, y-coordinates and optionally a z-coordinate, or x-, y-coordinates and height data). The location data may also be indicative of a further location, which in particular represents the whereabouts of the household appliance.

The method may be implemented before the start of a cleaning cycle.

The position of the dosing unit is checked before starting a cleaning cycle in the household appliance. By checking that the dosing unit is in the household appliance before the start of the cleaning cycle, it is possible to inform the user that he has forgotten to place the dosing unit in the household appliance. It is also possible to adjust the cleaning strategy if it is found that the dosing unit is not in the household appliance. For example, the absence of the dosing unit may lead to a change in the cleaning strategy and the use of cleaning agents that are dispensed from a tank of the household appliance instead of the dosing unit. A change in the cleaning strategy may also be caused by a change in the current cleaning program.

The treatment chamber data, for example, represents binary data that is indicative of whether or not the device is (actually) placed in the treatment chamber of the household appliance. Alternatively, the treatment chamber data may represent, for example, a probability value that indicates how likely it is that the device has been placed in the treatment chamber of the household appliance. The treatment chamber data may also include one or more additional parameters, which are described in more detail below.

The specific treatment chamber data is output or its output is initiated. The specific treatment chamber data is, for example, output to the household appliance. Alternatively or additionally, the specific treatment chamber data is output to a user device, for example a mobile device. Alternatively or additionally, the specific treatment chamber data may be output to at least one server (or to a server cloud), or to another entity that is different from the at least one server and transmits the specific treatment chamber data to the at least one server.

The specific treatment chamber data may be taken into account, for example, in controlling and/or regulating the household appliance and/or the device.

In the context of the present subject-matter, controlling and/or regulating the household appliance, for example via at least one server or directly from the device, means in particular that the household appliance may be controlled and/or regulated by the at least one server or by the device. Furthermore, this wording also means that data is transmitted by the at least one server, for example, to a user device (e.g. mobile device, such as a smartphone, tablet, wearable, IoT device, to name but a few non-limiting examples) or a home appliance server located in the household (also referred to as smart home server or smart home system), e.g. following a previous request, and controlling and/or regulating of the at least one household appliance is then carried out by the user device or the home appliance server located in the household. Accordingly, direct communication between the at least one household device and the at least one server may also take place. Alternatively, indirect communication between the at least one household device and the at least one server may take place, for example, via the user device and/or the home appliance server located in the household. In particular, the system shall also include at least one user device and/or the home appliance server located in the household.

In this way it is possible, in particular, to variably improve the result to be achieved with a household appliance with regard to the many possible situations and scenarios, in particular by using a large amount of existing data for controlling and/or regulating the household appliance. This is realized in particular by the fact that the household appliance may be controlled and/or regulated if the device is (actually) located in the treatment chamber of the household appliance.

Communication between the household appliance and the at least one server may, for example, be at least partially wireless and/or wired. Wireless communication may, for example, be based on mobile communication (e.g., according to 2G, GPRS (General Packet Radio Service), 3G, LTE (Long Term Evolution), or future 5G standards), or a short-range communication (e.g., according to BT (Bluetooth), BLE (Bluetooth Low Energy), ZigBee communication, just to name a few non-limiting examples), or on a WLAN (Wireless Local Area Network) based communication. For example, wired communication may be based on communication following the LAN (Local Area Network) and/or WAN (Wide Area Network) standard.

Furthermore, control and/or regulation of the household appliance may, for example, be carried out in such a way that an input is detected by an input device (e.g. voice input assistant device or the like), is forwarded by the input device to the at least one server, and subsequently control and/or regulation of the household appliance is carried out via this at least one server at least partially based on the input.

For example, based at least in part on the specific treatment chamber data, the device may recognize or detect whether it is inside the treatment chamber of the household appliance. By outputting or causing the output of the specific treatment chamber data, for example, the household appliance may learn (when the specific treatment chamber data is transmitted to the household device) that the device is inside the treatment chamber of the device. Alternatively or in addition, the household appliance may learn that the device is in the treatment chamber of the household appliance. For example, a user may confirm that the device is actually located in the treatment chamber of the appliance in the event that it cannot be determined with certainty, at least in part based on the particular treatment chamber data, that the device is located in the treatment chamber of the appliance.

An exemplary embodiment according to all aspects provides that the location data is detected by at least one sensor, wherein the at least one sensor is designed to detect one or more of the following parameters i) to vi):
i) light intensity;
ii) acoustic signal;
iii) conductivity;
iv) acceleration;
v) temperature; and
vi) signal strength or signal attenuation (e.g. by shielding a so-called shielding attenuation).

The presence of the dosing unit inside the household appliance may be assessed, for example, on the basis of a change in the values of these parameters (decrease in signal intensity when the door of the household appliance is closed, increase in temperature, an acoustic environment representative of a closed room, etc.).

These parameters (i) to (vi) may, for example, also be included in the treatment chamber data.

Light intensity, for example, may be detected by employing an optical sensor. An optical sensor is a sensor that may detect optical data such as light as data. For example, an LED as an optical sensor may both emit and detect light. A load condition of the treatment chamber from the household appliance may be determined by at least one transmitter LED and an optical sensor including at least one receiver LED. If transmitter LED and receiver LED are identical in design, a transmission or attenuation of the radiation due to the prevailing load of the treatment chamber may be determined in a particularly simple and direct way by the household appliance. The receiver LED may, for example, be located outside the device, for example, in the treatment chamber of the household appliance. Similarly, a configuration of transmitter LED and receiver LED in a reflection or emission measurement is possible.

Furthermore, an optical sensor is understood to be, in particular, a sensor which may determine an intensity of incident radiation, in particular electromagnetic radiation in the visible range and, alternatively or additionally, in a non-visible range. The optical sensor may include an image sensor, in particular a digital image sensor. In particular, at least one semiconductor element, diodes, CCD elements, for example a Bayer sensor, or CMOS elements, for example a Foveon X3 type sensor, may be used to determine the intensity of the radiation. The optical sensor may include optical filters and in particular a spectrometer. It is also conceivable to use monochrome sensors without color resolution. Optical sensors limited to certain wavelength ranges may also be used. The optical sensor may, for example, be based on at least one photo diode and/or at least one LED element. Individual elements or arrays of elements, for example photo diodes or light-sensitive components such as LEDs, may be used. It may be advantageous to optimize the size of the individual sensors, for example the individual photo diodes, in terms of dynamics, resolution and/or sensitivity.

The optical sensor, for example, includes at least one camera-like element and provides image data. Accordingly, digital cameras may be used as optical sensors for the device.

In particular, an optical sensor may be used to record data indicative of a change in light (e.g. increase or decrease in light intensity, temperature, or the like). For example, the light intensity detected by an optical sensor may decrease when the device is brought into the treatment chamber from outside the treatment chamber of the household appliance.

The acoustic signal may, for example, be detected by employing an acoustic sensor. An acoustic sensor is a sensor that may detect acoustic data. Such an acoustic sensor includes or is, for example, a microphone. The data acquired by the acoustic sensor may, for example, represent sound. Data acquired by the acoustic sensor is, for example, indicative of a mechanical condition of the device and/or the household appliance, in particular the treatment chamber of the household appliance. Unusual noises may, for example, indicate a defect of the device and/or household appliance. Furthermore, data acquired by the acoustic sensor may be indicative of a load condition of the treatment chamber and/or of a liquid level of the treatment chamber of the household appliance. Such an acoustic sensor includes or is, for example, an ultrasonic sensor, wherein data acquired by such an ultrasonic sensor is indicative of corresponding response signals, for example, on the basis of an ultrasonic pulse emitted by the ultrasonic sensor. A comparison with a reference value (which, for example, is determined in advance, e.g. within the framework of a training case) may, for example, determine whether or not the device is located inside the treatment chamber of the appliance. Acceleration may, for example, be measured using an acceleration sensor. An acceleration sensor is a sensor that measures its acceleration. This is done, for example, by determining the inertial force acting on a mass of the accelerometer. Thus it may, for example, be determined whether there is an increase or decrease in speed.

An acceleration sensor, for example, may represent a motion sensor. Such a motion sensor may, for example, detect a change in position. For example, a movement may be detected by employing an accelerometer in such a way that movements are calculated as an integration of acquired data (e.g. measured values) from an accelerometer. In this way, for example, the position of the device may be determined, e.g. in the treatment chamber of the household appliance.

The temperature may, for example, be measured by a temperature sensor. Such a temperature sensor is understood to be a sensor that acquired data indicative of a temperature prevailing in the environment of the temperature sensor.

For example, depending on the data acquired by a temperature sensor, which represents a prevailing temperature in the treatment chamber of the appliance, it may be determined whether a temperature increase or decrease has occurred. If, for example, a cleaning program is carried out by the household appliance and a temperature increase is detected by employing the temperature sensor, this is indicative, for example, of the presence of the device (including the temperature sensor) inside the treatment chamber of the appliance. Otherwise, no increase or decrease in temperature would be detected by the temperature sensor included in the device.

The signal strength may be determined, for example, by employing a communication interface included in the device and is indicative of one or more signals and their signal strength received at the location of the device. For example, the signal strength of signals receivable by the device and transmitted by one or more other communication devices is reduced by the nature (in particular metal) of the treatment chamber of the appliance. By placing the device in the treatment chamber of the appliance, signals are attenuated by the nature of the treatment chamber. This reduction or increase in signal strength when the device is placed in or removed from the treatment chamber of the household appliance may, for example, be indicative of whether or not the device is inside the treatment chamber of the household appliance.

Conductivity may, for example, be measured using a conductivity sensor to detect the presence of water.

Another exemplary embodiment according to all aspects is that the location data acquired is representative of the signal strength of one or more communication networks, whereby the signal strength is acquired based on signals transmitted by the one or more communication networks.

The one or more wireless communication networks are designed and/or set up according to the BT, BLE, WLAN standard, for example, or according to one or more mobile radio standards, for example the mobile radio standard, such as 2G, GPRS, 3G, 4G or LTE, or future further, so-called 5G mobile radio networks. The one or more wireless communication networks may each include one or more entities, such as routers, access points, base stations or the like, which each emit signals. These emitted signals may be received by the device with a certain signal strength. The signal strength changes depending on the location of the device. The signal strength may thus be indicative of the location of the device.

In an exemplary embodiment according to all aspects, the determination of the treatment data includes a determination of a signal attenuation at least partially based on the acquired data, which represents the signal strength of one or more communication networks.

For example, signal attenuation is determined based on a change in the location of the device, which changes the signal strength of signals transmitted by one or more communication networks, e.g. attenuates them. Alternatively or additionally, the signal attenuation may be determined based on signals from only one or more preselected communication networks, e.g. a WLAN communication network. Since signals originating from a WLAN communication network in particular may be received at the installation location by household appliances belonging to the same household, it may be advantageous to limit the signal attenuation to signals from such a WLAN communication network.

To determine whether signal attenuation is present, two measurements may, for example, be taken at a time interval from each other. A first measurement may, for example, be performed as a calibration (inside or outside the treatment chamber of the household appliance) and then a second measurement may be performed to detect a change compared to the first measurement. Furthermore, for example, one or more of such second measurements may be taken after the first calibration measurement. In the event that several further measurements are made after the first measurement, they may be carried out continuously or discretely (for example, at predetermined intervals).

In a further exemplary embodiment according to all aspects, the treatment chamber data is further determined at least partially based on one or more of the following acquired inputs i) and ii):
i) one or more user inputs; and
ii) one or more inputs acquired by the at least one device via a communication interface.

The one or more user input(s) may, for example, be acquired by a user device. Such user equipment is, for example, an entity separate from the device. The user device is, for example, a mobile device (e.g. smartphone, tablet, wearable, IoT (Internet-of-Things) device, to name just a few non-limiting examples). The user device is for example portable, weighing less than about 5, 4, 3, 2, or 1 kg.

The communication interface provides, for example, an interface between at least two entities (e.g. household appliance and device, and/or user equipment and device, and/or server and device, to name but a few possible and non-limiting combinations). Furthermore, the communication interface provides, for example, an interface to connect two entities each connected to a different communication network, so that in particular (bi-)directional communication between the at least two entities is possible. It goes without saying that further entities may also be connected via the interface device to the at least one household appliance and/or the at least one server.

In an exemplary embodiment according to all aspects, the communication interface includes at least one transceiver for communication with the at least one household appliance (e.g. according to BT, BLE, WLAN standard), and optionally one or more further transceivers for communication with one or more further entities, such as the user device and/or the at least one server. The one or more further transceivers are set up and/or designed, for example, according to the mobile radio (2G, GPRS, 3G, LTE, 5G) standard.

Alternatively or in addition, direct communication with an entity other than the device (e.g. user equipment) may take place.

Furthermore, communication between the device and an input assistance device may take place using the communication interface of the device. The at least one input assistant device is, for example, a voice input assistant device, such as Amazon's product marketed under the name Alexa, a home appliance server (such as a smart home system, to give just one non-limiting example). The voice input assistant device may, for example, perform a capture of at least one voice command indicative of at least one parameter on the basis of which treatment chamber data and/or home appliance control and/or regulation may be performed at least in part.

The voice command may, for example, be entered by a user, e.g. via a voice communication interface (e.g. an electronic device containing a microphone or the like). The voice command entered may, for example, be processed locally by the voice communication interface or by a server. For processing by a server, the voice command may, for example, be transmitted to a server after input via a communication connection of the input assistant device. Using voice recognition software, the entered voice command may, for example, be processed. This may require the installation of additional software. A voice command processed in this way may, for example, be converted into a control parameter which the user device and/or at least one household appliance may, for example, evaluate, process, forward or use in any other way.

The determination of the treatment chamber data may, in particular, be based on all available and above-mentioned data.

An exemplary embodiment in all aspects provides that the location data is also acquired in the context of a treatment carried out by the household appliance on objects placed in the treatment chamber.

The location data is acquired, for example, during a treatment of objects placed in the treatment chamber carried out by the household appliance. The treatment of objects placed in the treatment chamber of the household appliance is carried out, for example, by the household appliance running a cleaning program. The location data may, for example, be acquired by one or more sensors each acquiring one or more items of information. For example, the one or more sensors may acquire data indicative of light intensity, acoustic signals, conductivity, acceleration, temperature, signal strength, or a combination thereof. In particular, a conclusion about the presence of water may thereby be drawn, at least partially based on data indicative of conductivity, and/or about the temperature, and/or about mechanical properties (e.g. movement) of the device, so that a conclusion may be drawn about the location of the device. In the case of the presence of water, it may be assumed, for example, that the device is located inside the treatment chamber of the household appliance.

An exemplary embodiment according to all aspects provides that the method further includes:
    determining control data based at least in part on the determined treatment data; and outputting or causing the output of the specified control data and/or performing or causing an action to be performed at least partially based on the specified control data.

In an exemplary embodiment according to all aspects, the action includes communication with the household appliance and optionally with one or more other entities, e.g. other household appliances, or devices such as smart home servers, or server clouds on the Internet.

Communication with the household appliance and optionally with one or more other entities, e.g. other household appliances, or devices such as smart home servers or server clouds on the Internet.

The control data may, for example, also cause the device to be controlled and/or regulated. The control data may also, for example, be used to control and/or regulate the household appliance, such as switching the household appliance on and/or off. With regard to switching the household appliance on and/or off, it may, for example, be influenced whether (at all) the household appliance is switched on and/or off and/or at what time (time, date, or immediately if the appliance is inside the treatment chamber of the appliance) the household appliance is switched on and/or off.

The action may also affect the operating mode (e.g. type of cleaning program) of the household appliance. This may include, for example, selecting a specific (e.g. preprogrammed) program, running additional programs, influencing the program time (e.g. lengthening or shortening), changing individual parameters of the cleaning program (in the case of a washing machine, for example, temperature, spin speed, or the like). For this purpose, for example, further data which may be acquired by the device (type of objects in the treatment chamber, filling level of the treatment chamber, to name only a few non-limiting examples) may be evaluated or the determination of the control data is furthermore based at least partially on such data.

In addition or alternatively, it is possible that the action also provides the user with a recommendation regarding the device and/or the household appliance. It may, for example, be possible that in addition to an automated adjustment of parameters of a cleaning program from the household appliance, manual pre-treatment (e.g. of clothes, dishes, or the like) may be necessary. Such a recommendation may be displayed or communicated to the user by employing the user equipment.

The control data may, for example, include one or more output parameters. Examples of an output parameter are an output quantity, an output time, output temperature and/or output duration. An output parameter specifies, for example, an output quantity, an output time, output temperature and/or output duration for the output of a preparation stored by the device. The fact that the control data is set up to at least partially control the dispensing is to be understood, for example, as meaning that the control data causes the preparation to be dispensed in accordance with the dispensing parameters specified by the control data.

In addition or alternatively, the action includes or represents, for example, a safety-relevant parameter, e.g. whether a door closing the treatment chamber of the household appliance is opened or closed, whether the device is located outside the treatment chamber of the household appliance, whether a water connection is connected to the household appliance for supplying water into the treatment chamber or not, whether an energy storage device of the appliance has a certain charge status, or the like, to name only a few non-limiting examples.

The action may, for example, require communication with other entities distinct from the device (e.g., household appliance, user equipment, server, or a combination thereof), or may be limited to an action that may be performed solely by the device itself.

In a further exemplary embodiment in all aspects, the specific treatment chamber data represents whether or not treated objects and/or at least the device are still inside the treatment chamber of the household appliance after a treatment performed by the household appliance.

For example, an action by the device and/or by the household appliance, such as a message to the user, may then be carried out at least partially based on the treatment chamber data, e.g. if treated objects (e.g. laundry or dishes) have been forgotten in the treatment chamber, or if untreated objects are stored in the treatment chamber for a certain time (e.g. too long), sometimes developing bad odor may be at least partially neutralized, e.g. by a dosage of hygiene and/or fragrance agents.

An exemplary embodiment according to all aspects provides that the at least one device is a dosing device.

Such a dosing device is, for example, placed in the treatment chamber (e.g. the washing drum of a washing machine) of the household appliance (e.g. a washing process) before the start of a treatment of objects in the treatment chamber. Such a device includes, for example, features for dosing the preparation stored in the dosing device. The dosing device is configured and/or designed in particular according to the first and/or second aspect of the present disclosure.

A further exemplary embodiment according to all aspects stipulates that the method is also at least partially performed by a server.

In particular, individual method steps (e.g. determining the treatment chamber data, and/or determining the control data) may be performed by the server. Alternatively, a server cloud including at least two interconnected (e.g. communicating) servers may perform at least one or more (partial) steps of the method according to the first aspect of the present disclosure.

According to the second aspect of the present disclosure an alternative device is also described, including at least one processor and at least one memory with computer program code, wherein the at least one memory and the computer program code are configured to execute and/or control with the at least one processor at least one method according to the first aspect. A processor is to be understood, for example, as a control unit, a microprocessor, a micro-control unit such as a micro-controller, a Digital Signal Processor (DSP), an Application-Specific Integrated Circuit (ASIC) or a Field Programmable Gate Array (FPGA).

For example, an exemplary device further includes features for storing data such as a program memory and/or a main memory. For example, an exemplary device as contemplated herein further includes features for receiving and/or transmitting data via a network such as a network interface. For example, exemplary devices as contemplated herein are interconnected and/or connectable via one or more networks.

An exemplary device according to the second aspect is or includes, for example, a data processing system which is configured in software and/or hardware to be able to perform the respective steps of an exemplary method according to the second aspect. Examples of data processing equipment are a computer, a desktop computer, a server, a thin client and/or a portable computer (mobile device), such as a laptop computer, a tablet computer, a wearable, a personal digital assistant or a smartphone.

An exemplary embodiment by all aspects implies that the device is a dosing device.

Further devices may be provided, for example, a server and/or a part or component of a so-called computer cloud, which dynamically provides data processing resources for different users in a communication system. In particular, a computer cloud is understood to be a data processing infrastructure according to the definition of the "National Institute for Standards and Technology" (NIST) for the term "Cloud Computing". An example of a computer cloud is a Microsoft Windows Azure Platform.

According to the second aspect of the present disclosure, a computer program is also described which includes program instructions which cause a processor to execute and/or control a method according to the first aspect when the computer program runs on the processor. An exemplary program as contemplated herein may be stored in or on a computer-readable storage medium containing one or more programs.

According to the second aspect of the present disclosure, a computer-readable storage medium containing a computer program according to the second aspect is also described. A computer-readable storage medium may, for example, be a magnetic, electrical, electro-magnetic, optical and/or other type of storage medium. Such a computer-readable storage medium is for example physical (i.e. "touchable"), for example it is designed as a data storage device. Such a data storage device is, for example, portable or permanently installed in a device. Examples of such a data storage device are volatile or non-volatile Random Access Memories (RAM) such as NOR flash memories or sequential access memories such as NAND flash memories and/or Read-Only Memories (ROM) or read-write memories. Computer-readable shall be understood to mean, for example, that the storage medium may be read and/or written by a computer or data processing equipment, such as a processor.

According to a third aspect of the present disclosure, a system is also described including several devices, in particular a household appliance and a further device separate therefrom, which are configured to jointly perform a method according to the first aspect.

An exemplary system according to the third aspect includes an exemplary household appliance and additionally a further device, for example a mobile device or a server for at least partially (i.e. at least one method step of the method according to the first aspect) performing an exemplary method according to the first aspect.

A further exemplary embodiment according to all aspects service provided by the at least one server is a cloud service.

Such cloud services are provided, for example, under the names "BSH Cloud", "Alexa Cloud", "PLUME Cloud", "Henkel Cloud", "Smarthome Cloud", just to name a few non-limiting examples.

The cloud service is exemplified by the fact that the cloud service stores and synchronizes data for a large number of different users, so that the data may be used by one or more entities. Furthermore, the cloud service may provide different services, such as storing user-specific data, aggregating data of different users, or similar services for a large number of users. The services may increase user convenience, for example, because data are available on different entities (of the user) without user intervention. For example, the at least one household entity may store status data representative of, for example, the progress of a washing or cleaning program performed by the at least one household entity. The user may then request this status, for example from his user equipment. It is understood that the use of the cloud service is not limited to the reproduction of data.

The exemplary embodiments of the present disclosure described above in this description should also be understood in all combinations with each other. In particular, exemplary embodiments should be understood in relation to the different aspects disclosed.

In particular, the previous or following description of method steps according to exemplary embodiments of a method should also reveal corresponding features for carrying out the method steps by exemplary embodiments of a device. Likewise, by the disclosure of employing a device for performing a method step, the corresponding method step shall also be disclosed.

Further advantageous exemplary embodiments of the present disclosure are shown in the following detailed description of some exemplary embodiments of the present disclosure, especially in connection with the Figures. The Figures, however, are only intended to clarify, but not to determine the scope of protection of the present disclosure. The Figures are not to scale and are merely intended to illustrate the general concept of the present disclosure. In particular, features included in the Figures are not intended to be considered as a necessary element of the present disclosure.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
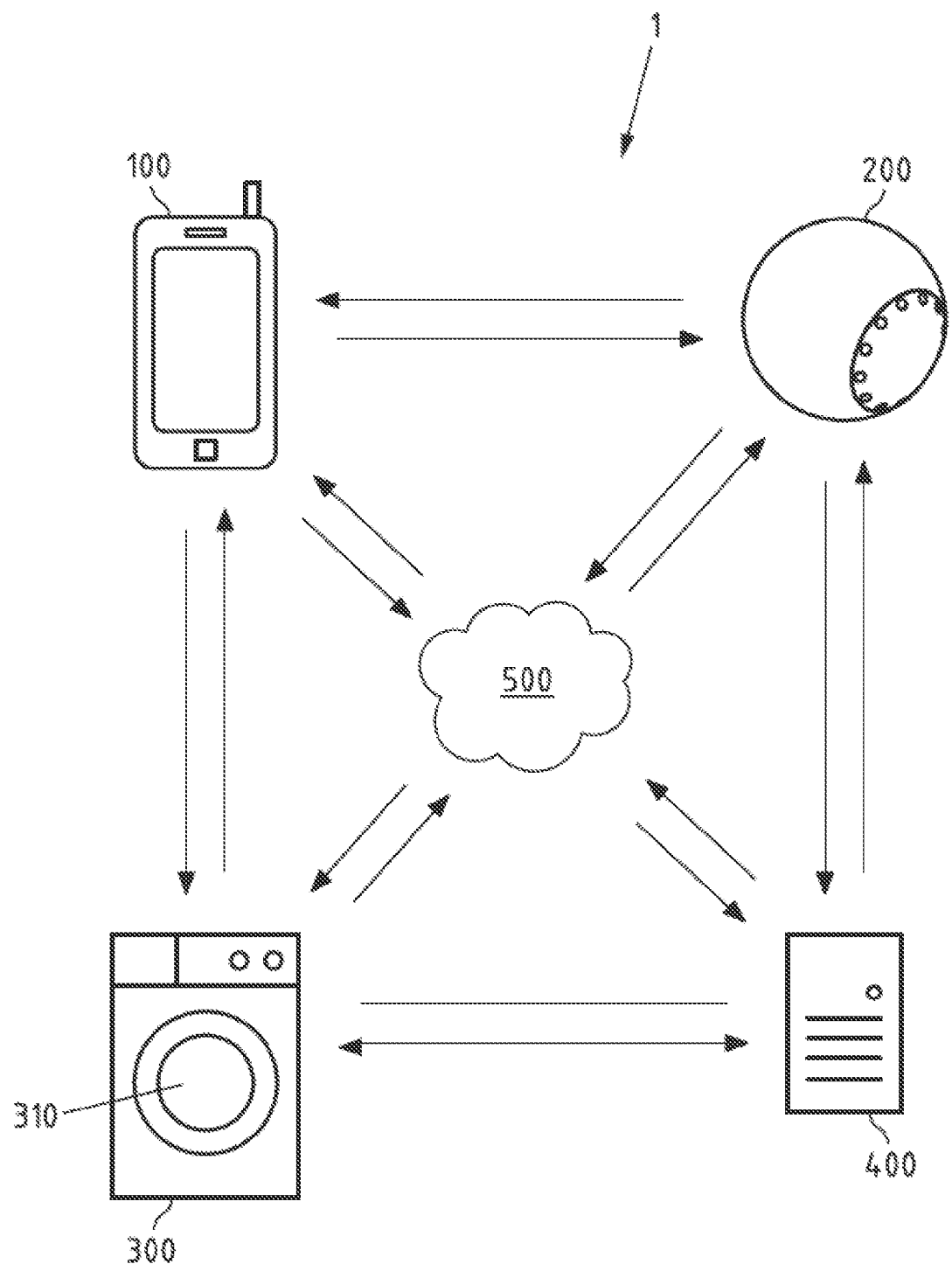
FIG. 1 shows a schematic representation of an embodiment of a system according to the third aspect of the present disclosure.

FIG. 1 shows first of all a schematic representation of an embodiment of a System 1 as contemplated herein including the devices 100, 200, 300 and 400. System 1 is configured to execute exemplary methods as contemplated herein. Device 200 is an exemplary mobile device 200, which in this case may be placed in the treatment chamber 310 of the household appliance 300 (here exemplarily configured as a washing machine). Both the device 200 and the washing machine 300 may each be a device as contemplated herein. Furthermore, System 1 includes as a further device mobile device 100 in the form of a smartphone, tablet, wearable, or the like (here exemplarily configured as a smartphone). Mobile device 100 may also be a device as contemplated herein or may perform individual steps of exemplary methods as contemplated herein. However, device 100 may also be a computer, a desktop computer or a portable computer, such as a laptop computer, a tablet computer, a Personal Digital Assistant (PDA). In addition to or alternatively to devices 300 and 100, the system may also include a server 400. It is also conceivable that System 1 may also include fewer or more than three devices.

While the examples given here are described in particular in connection with household appliance 300 in the form of a washing machine, the explanations also apply mutatis mutandis to other types of household appliances, such as a dishwasher, a tumble dryer, a toilet or similar.

Each of the devices 100, 200, 300, 400 may have a communication interface to communicate and/or to exchange data with one or more of the other devices, e.g. directly via a wireless (Bluetooth, WLAN, ZigBee, NFC, to name but a few non-limiting examples) and/or wired (LAN) connection, and/or via a communication network 500, such as the Internet, and/or a local network covering the devices 100, 200, 300.

Figure 2:
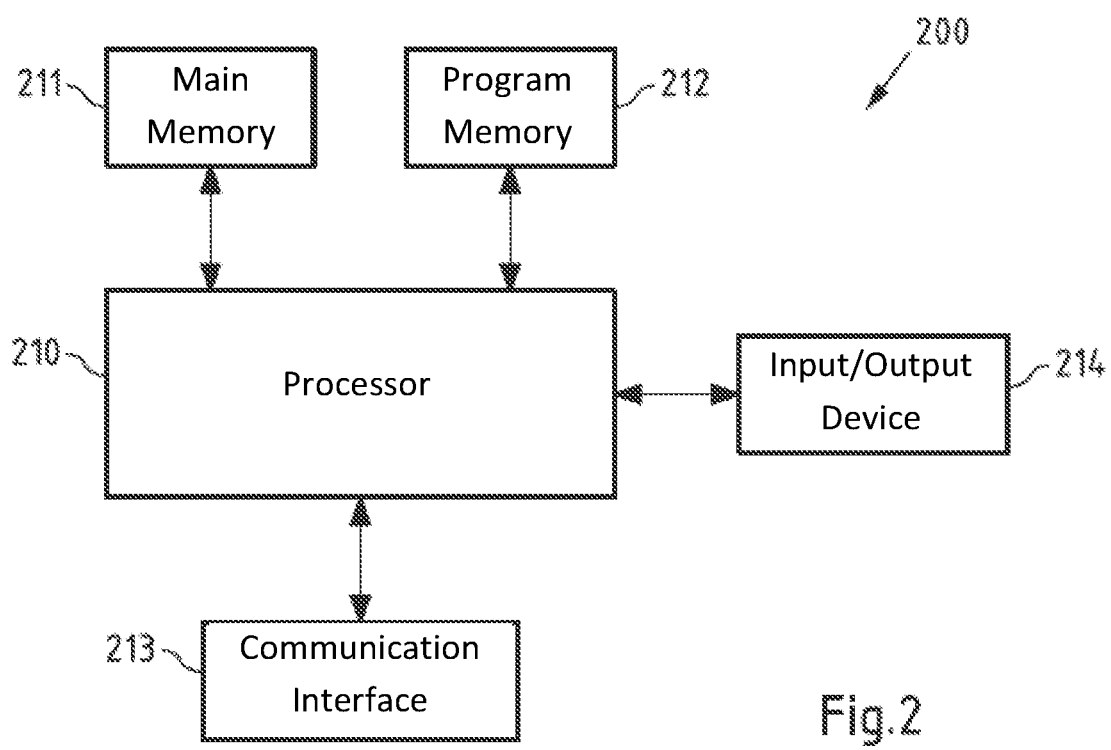
FIG. 2 shows a block diagram of an embodiment of a device according to the second aspect of the present disclosure for carrying out an embodiment of a method as contemplated herein.

FIG. 2 shows a block diagram 200 of an embodiment of a device as contemplated herein for the execution of an embodiment of a method as contemplated herein. The block diagram 200 in FIG. 2 may be an example of either device 200 shown in FIG. 1, washing machine 300 shown, mobile device 100 (or part thereof) shown, or server 400 shown.

Processor 210 of device 200 is designed in particular as a microprocessor, micro-controller unit, micro-controller, Digital Signal Processor (DSP), Application-Specific Integrated Circuit (ASIC) or Field Programmable Gate Array (FPGA).

Processor 210 executes program instructions stored in program memory 212 and stores, for example, intermediate results or the like in the working or main memory 211. Program memory 212 is, for example, a non-volatile memory such as a flash memory, a magnetic memory, an EEPROM memory (Electrically Erasable Programmable Read-Only Memory) and/or an optical memory. Main memory 211 is, for example, a volatile or non-volatile memory, in particular a Random Access Memory (RAM) such as a Static RAM memory (SRAM), a Dynamic RAM memory (DRAM), a Ferroelectric RAM memory (FeRAM) and/or a Magnetic RAM memory (MRAM).

Program memory 212 is for example a local data storage medium firmly connected to device 200. Data storage media permanently connected to device 200 is, for example, hard disks which are built into device 200. Alternatively, the data storage medium may, for example, also be a data storage medium that is detachably connectable to device 200.

Program memory 212 contains, for example, the operating system of device 200, which is at least partially loaded into main memory 211 when the device 200 is started and is executed by processor 210. In particular, when device 200 is started, at least part of the core of the operating system is loaded into main memory 211 and executed by processor 210.

In particular, the operating system allows the use of device 200 for data processing. For example, it manages resources such as main memory 211 and program memory 212, communication interface 213, input and output device 214, provides basic functions to other programs through programming interfaces and controls the execution of programs.

Processor 210 further controls communication interface 213, which may, for example, be a network interface and may be designed as a network card, network module and/or modem. Communication interface 213 is configured in particular to establish a connection of device 200 with other devices (e.g. mobile device 100, household appliance 300, and/or server 400 according to FIG. 1), in particular via a (wireless) communication system (e.g. communication network 500 according to FIG. 1), for example a network, and to communicate with them. Communication interface 213 may, for example, receive data (via the communication system) and forward it to processor 210 and/or receive data from processor 210 and send it (via the communication system). Examples of a communication system are a local area network (LAN), a wide area network (WAN), a wireless network (e.g. according to the IEEE 802.11 standard, the Bluetooth (LE) standard and/or the NFC standard), a wired network, a mobile network, a telephone network and/or the Internet. For example, communication is possible with the Internet and/or other devices using the communication interface 213. In the case of devices 100, 300, 400, communication interface 213 may be used to communicate with the other devices 100, 300, 400 or the Internet.

Via such communication interface 213, in particular location data (cf. step 301 according to FIG. 3) and/or specific treatment data (cf. step 302 according to FIG. 3) may be received and/or transmitted, which allow a conclusion to be drawn as to whether or not device 200 has been placed in a treatment chamber (e.g. treatment chamber 310 according to FIG. 1) of a household appliance (e.g. washing machine 300 according to FIG. 1). Furthermore, the components shown (and, if required, further components) may be used to control and/or adjust a household appliance (e.g. washing machine 300 according to FIG. 1) and/or the device (e.g. device 200 according to FIG. 1), taking into account the treatment data received.

Furthermore, processor 210 may control at least one input/output device 214. Input/output device 214 is, for example, a keyboard, a mouse, a display unit, a microphone, a touch-sensitive display unit, a loudspeaker, a reader, a drive and/or a camera. For example, input/output device 214 may receive input from a user and forward it to processor 210 and/or receive and output data for the user from processor 210.

Finally, device 200 may include at least one acceleration sensor (not shown in FIG. 2), and optionally one or more additional sensors (not shown in FIG. 2). One of the one or more additional sensors is, for example, a GPS module, in order to obtain location data of the corresponding device. Another example of a further sensor is a temperature sensor, a conductivity sensor, and/or an optical sensor to obtain temperature data, conductivity data, and/or optical data (e.g. representing light intensity).

Figure 3:
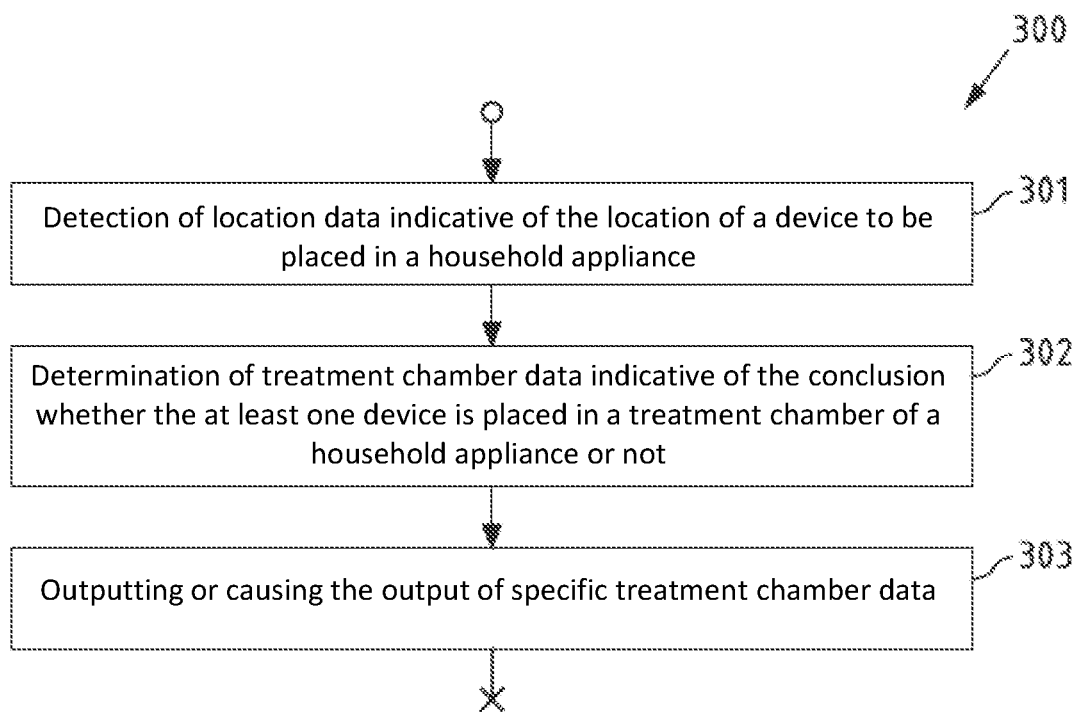
FIG. 3 shows a flow chart of an embodiment according to a method based on the first aspect of the present disclosure.

FIG. 3 shows a flowchart 100 of an embodiment of a method according to the first aspect, which is performed by a device, for example device 200 of FIG. 2 or device 200 of FIG. 1.

In a first step 301, location data may be entered indicative of the location of a device (e.g. household appliance 200 according to FIG. 1) that may be placed in a household appliance (e.g. household appliance 300 according to FIG. 1). The location data is acquired, for example, by one or more sensors that device 200 includes.

The location data represents, for example, one or more of the following parameters i) to vi):
i) light intensity;
ii) acoustic signal;
iii) conductivity;
iv) acceleration;
v) temperature; and vi) signal strength or signal attenuation.

Accordingly, the device (e.g. device 200 according to FIG. 1) may, for example, include one or more light sensors (light intensity), microphones (acoustic signal), conductivity sensors (conductivity), temperature sensors (temperature), communication interfaces (signal strength may be derived from signals received from the communication network), or a combination thereof.

In a second step 302, treatment data may be determined indicative of a conclusion as to whether or not the at least one device has been placed in a treatment chamber (e.g. treatment chamber 310 of the household appliance 300 according to FIG. 1) of the household appliance. The treatment chamber data is determined at least partially based on the location data acquired (see step 301).

In a third step 303, the determined treatment data may be output or caused to be output, e.g. from device 200 according to FIG. 1 to a server (e.g. server 400 according to FIG. 1) and/or to the household appliance (e.g. household appliance 300 according to FIG. 1). The output or the initiation of the output of the specific treatment data may, for example, take place via a communication network, e.g. via the communication network 500 according to FIG. 1.

Figure 4:
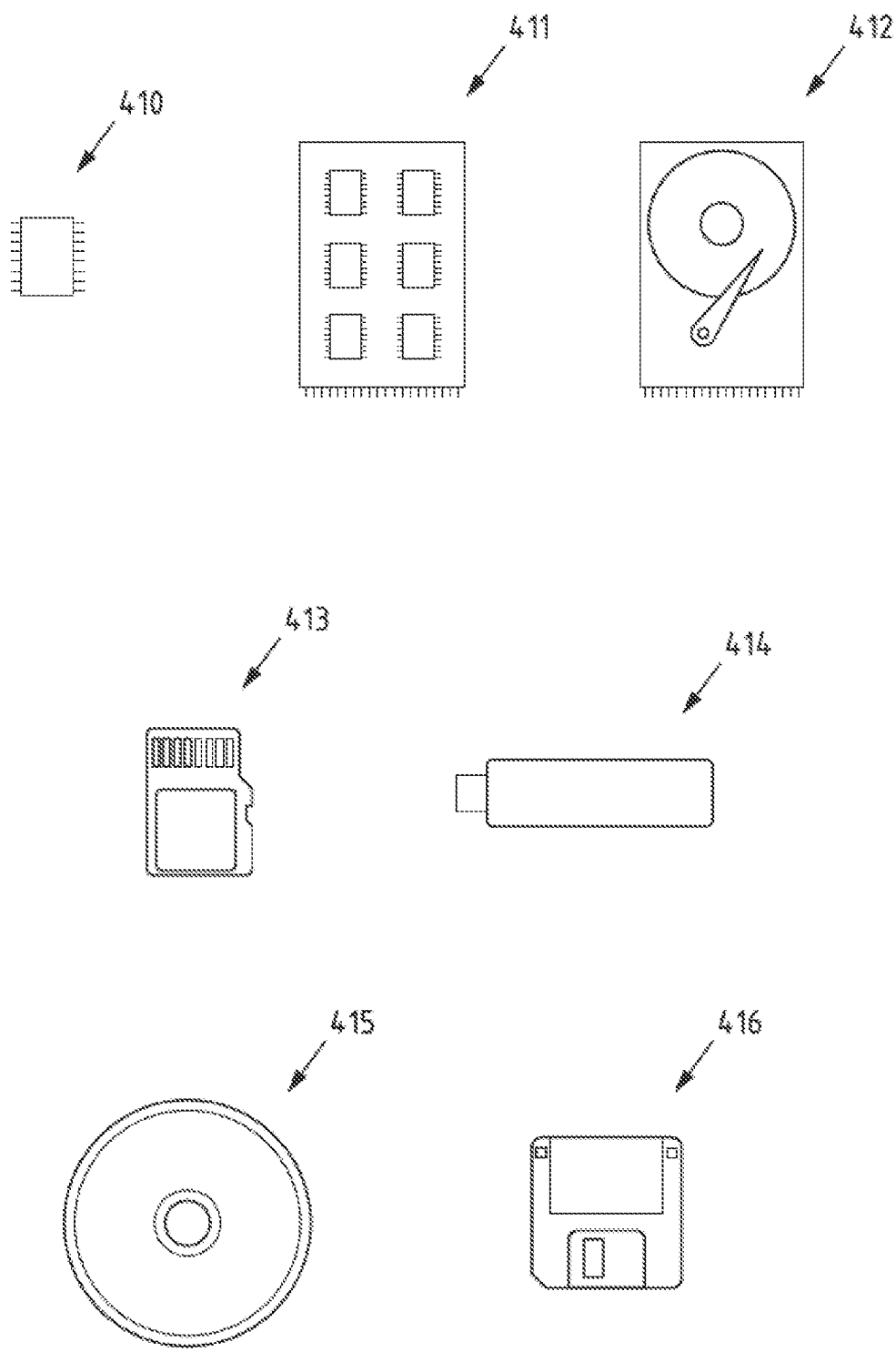
FIG. 4 shows different embodiments of a storage medium according to the second aspect of the present disclosure.

FIG. 4 finally shows different embodiments of storage media on which an embodiment of a computer program as contemplated herein may be stored. The storage medium may, for example, be a magnetic, electrical, optical and/or other type of storage medium. The storage medium may, for example, be part of a processor (e.g., processor 210 of FIG. 2), for example, a (non-volatile or volatile) program memory of the processor or a part thereof (such as program memory 212 in FIG. 2). Embodiments of a storage medium are a flash memory 410, an SSD hard disk drive 411, a magnetic hard disk drive 412, a memory card 413, a memory stick 414 (e.g. a USB stick), a CD-ROM or DVD 415 or a floppy disk 416.

The embodiments of the present disclosure described in this specification and the optional features and characteristics mentioned in each case shall also be understood as disclosed in all combinations with each other. In particular, unless explicitly stated otherwise, the description of a feature included in an embodiment shall not be understood in the present case to mean that the feature is indispensable or essential for the function of the example. The sequence of the method steps described in this specification in the individual flowcharts is not mandatory; alternative sequences of method steps are conceivable. The method steps may be implemented in various ways, for example, implementation in software (through program instructions), hardware, or a combination of both to implement the method steps is conceivable.

Terms used in the Claims such as "comprising", "having", "containing", "including" and the like do not exclude further elements or steps. The expression "at least partially" covers both the "partially" case and the "completely" case. The wording "and/or" should be understood to mean that both the alternative and the combination should be disclosed, i.e. "A and/or B" means "(A) or (B) or (A and B)". The use of the indefinite article does not exclude a plural. A single device may perform the functions of several units or devices mentioned in the Claims. Reference marks indicated in the Claims are not to be regarded as limitations of the means and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by at least one device, comprising:
   acquiring location data indicative of a location of a device which is placed in a household appliance comprising liquid and/or gas, wherein the device is a dosing device or a physical treatment device;
   determining treatment chamber data indicative of a conclusion as to whether or not the device is placed in a treatment chamber of the household appliance, wherein the treatment chamber data is determined at least partially based on the location data; and
   outputting or causing output of the treatment chamber data,
   wherein the location data is acquired by at least one sensor, wherein the at least one sensor is designed to acquire one or more of the following parameters i) to vi):
   i) light intensity;
   ii) acoustic signal;
   iii) conductivity;
   iv) acceleration;
   v) temperature; and/or
   vi) signal strength or signal attenuation.

2. The method according to claim 1, wherein the method is implemented before the start of a cleaning cycle of the household appliance.

3. The method according to claim 1, wherein the treatment chamber data is further determined based at least in part on one or more of the following detected inputs
   i) one or more user inputs; and/or
   ii) one or more inputs acquired by the device via a communication interface.

4. The method according to claim 1, wherein the location data is further acquired in the context of a treatment carried out by the household appliance of objects placed in the treatment chamber.

5. The method according to claim 1, the method further comprising:
   determining control data at least partially based on the treatment data; and
   outputting or causing the output of the control data and/or performing or causing an action to be performed at least partially based on the control data.

6. The method according to claim 5, wherein the action comprises communication with the household appliance and optionally with one or more further appliances.

7. The method according to claim 1, wherein the treatment chamber data represents whether treated objects and/or the device after a treatment performed by the household appliance are still inside the treatment chamber of the household appliance.

8. The method according to claim 1, wherein the method is further at least partially performed by a server.

9. A device configured to perform a method comprising:
   a processor that implements a computer program comprising one or more program instructions that cause the processor to execute the method steps of:
   acquiring location data indicative of a location of the device which is placed in a household appliance comprising liquid and/or gas, wherein the device is a dosing device or a Physical treatment device;

determining treatment chamber data indicative of a conclusion as to whether or not the device is placed in a treatment chamber of the household appliance, wherein the treatment chamber data is determined at least partially based on the location data; and outputting or causing output of the treatment chamber data, wherein the location data is acquired by at least one sensor, wherein the at least one sensor is designed to acquire one or more of the following parameters i) to vi):
i) light intensity;
ii) acoustic signal;
iii) conductivity;
iv) acceleration;
v) temperature; and/or
vi) signal strength or signal attenuation.

10. A method performed by at least one device, comprising:

acquiring location data indicative of a location of a device which is placed in a household appliance comprising liquid and/or gas, wherein the device is a dosing device or a physical treatment device;

determining treatment chamber data indicative of a conclusion as to whether or not the device is placed in a treatment chamber of the household appliance, wherein the treatment chamber data is determined at least partially based on the location data; and outputting or causing output of the treatment chamber data, wherein the location data is representative of signal strength from one or more wireless communication networks, wherein the signal strength is acquired based on signals transmitted from the one or more wireless communication networks.

11. The method according to claim 10, wherein determining the treatment chamber data comprises determining signal attenuation at least partially based on the acquired data representative of the signal strength from the one or more wireless communication networks.

12. The method according to claim 10, wherein the treatment chamber data is further determined based at least in part on one or more of the following detected inputs:
i) one or more user inputs; and/or
ii) one or more inputs acquired by the device via a communication interface.

13. The method according to claim 10, wherein the location data is further acquired in the context of a treatment carried out by the household appliance of objects placed in the treatment chamber.

14. The method according to claim 10, the method further comprising:

determining control data at least partially based on the treatment data; and outputting or causing the output of the control data and/or performing or causing an action to be performed at least partially based on the control data, wherein the action comprises communication with the household appliance and optionally with one or more further appliances.

15. The method according to claim 10, wherein the treatment chamber data represents whether treated objects and/or the device after a treatment performed by the household appliance are still inside the treatment chamber of the household appliance.

16. The method according to claim 10, wherein the method is further at least partially performed by a server.

* * * * *